United States Patent [19]

Lewis et al.

[11] 3,790,438

[45] Feb. 5, 1974

[54] RIBBON-REINFORCED COMPOSITES

[75] Inventors: Thomas B. Lewis; Lawrence E. Nielsen, both of Creve Coeur, Mo.

[73] Assignee: Monsanto Company, St. Louis, Mo.

[22] Filed: Dec. 28, 1971

[21] Appl. No.: 213,116

[52] U.S. Cl..................... 161/172, 117/72, 161/175, 161/197, 161/203, 161/227, 161/297
[51] Int. Cl.............................................. D02g 3/00
[58] Field of Search .............. 161/172, 175; 117/72

[56] References Cited
OTHER PUBLICATIONS

Statistical Theory of Strength of Laminated Composites II, Scop et al., Composite Malerials, Vol. 3, pp. 30–47 (1/69)

*Primary Examiner*—George F. Lesmes
*Assistant Examiner*—M. B. Wittenberg
*Attorney, Agent, or Firm*—Robert E. Hartenberger et al.

[57] ABSTRACT

Ribbon reinforced composites comprising (a) a strain-hardenable polymer having a tensile elongation to break greater than 25 percent, and a lap shear strength characteristic of a good adhesive material; and (b) between about 20 and 90 volume percent of a ribbon reinforcement having a tensile modular ratio greater than 5. One feature of the above composites pertains to the particular placement of the ribbons with respect to one another.

19 Claims, 3 Drawing Figures

RIBBON-REINFORCED COMPOSITES

BACKGROUND OF THE INVENTION

This invention pertains to polymeric compositions reinforced with fibers having a substantially rectangular cross-section. Fibers with such a geometric configuration are referred to herein as ribbons.

A great deal of work has been directed to polymeric compositions reinforced with a number of different materials in a variety of shapes and sizes. Polymers modified with particulate fillers have been extensively reported in the prior art. Such compositions have often been noted for their economy and occasionally for some improvement in their mechanical properties by comparison to the properties of the base resin. Although fabrication techniques can alter the isotropy of the system, particulate-reinforced polymers tend to be isotropic. Conversely, fiber-reinforced polymeric compositions often are anisotropic in nature because of fiber orientation within the polymeric matrix unless special techniques are employed to prevent fiber orientation. In most instances, anisotropic behavior of fiber-reinforced compositions is a by-product of a desirable condition, i.e., a high strength to weight ratio along one axis of the composition. To provide polymeric compositions with mechanical properties which are improved in more than one direction, it has been customary to orient the fibers in a composition along more than one axis. This is at best, however, a compromise since multi-axial orientation of fiber almost invariably produces a product with mechanical properties in one direction reduced below a level which could have been obtained with uniaxial fiber alignment.

In recent years ribbons, having a rectangular cross-section, in contrast to more conventional fibers with a circular cross-section, have been fabricated and used as reinforcing agents in polymeric compositions. Ribbons can possess certain advantages over circular cross-sectional fibers insofar as they are capable, at least theoretically, of providing substantial biaxial reinforcement in a polymeric composition. A ribbon provides reinforcement in the plane parallel to its flat surface. That is, in addition to reinforcement along its longitudinal axis, reinforcement is obtained perpendicular to the longitudinal axis. Optimizing the extent of reinforcement in the plane parallel to the flat surface of aligned ribbon reinforcement remains a problem, however, on which investigators continue to work. One area of investigation pertains to an evaluation of geometrical arrangements of ribbons in a matrix to enhance mechanical properties. Another area pertains to an investigation of matrix materials which can be most effectively reinforced by ribbons.

SUMMARY OF THE INVENTION

Investigations of either of the above areas are capable of yielding ribbon-reinforced polymers with improved biaxial properties. Simultaneously maximizing both parameters of geometric ribbon orientation and polymeric matrix selection would constitute an advance in the art heretofore unattained and is therefore one of the principal objects of this invention.

This invention pertains to reinforced composites comprising a polymer and ribbon reinforcement oriented in said polymer in layers such that the ribbons in the polymer are substantially parallel to one another, a. said polymer having a tensile elongation to break greater than about 25 percent; a tensile strength to break greater than 90 percent of the tensile strength to yield; and a lap shear strength greater than $\sigma_r$ $t$ X/B Y where $\sigma_R$ is the tensile strength of the ribbon, $t$ is the thickness of the ribbon, B is the minimum overlap distance between ribbons in adjacent ribbon layers, Y is the number of ribbon layers required for a repeat of the ribbon lay-up pattern, and X is the minimum number of ribbon layers that actually carry stress in a thickness equal to the repeat thickness; and b. said ribbon reinforcement having a tensile modular ratio greater than about 5, a strength to weight value of at least about 250, and being present in an amount from about 20 to about 90 percent by volume of the total composite and positioned in the composite in such a manner that X/Y is between 0.5 and 1, B has a value between 0.25 and 0.5 W, and the number of layers is at least 2Y when Y is 3 or less, where X, Y and B are as defined above and W is the width of the ribbon.

The foregoing composites are useful in those applications where the unmodified polymers might be useful but where increased strength and rigidity of the polymer is desired. Since a principal object of the present invention, achieved by the composites described above, is to provide a reinforced composite with reduced anisotropy and a higher strength to weight ratio than previously possible, the foregoing composites are particularly useful in applications where they are likely to be subjected to biaxial stresses.

BRIEF DESCRIPTION OF THE DRAWINGS

The present invention will be more readily understood by reference to the accompanying drawings in which.

DESCRIPTION OF THE PREFERRED EMBODIMENTS

Figure 1:
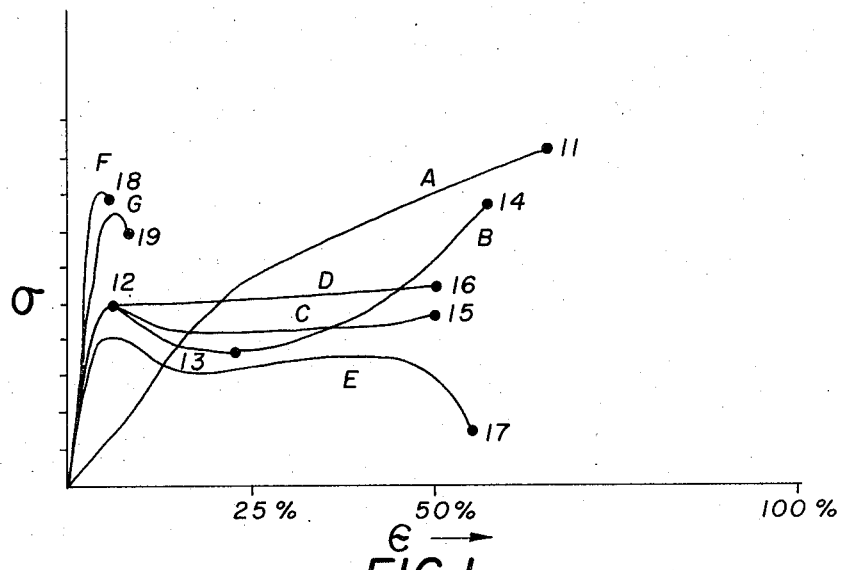
FIG. 1 is a representation of stress-strain curves exhibited by a number of polymeric compositions, showing compositions both within and outside the scope of this invention.

Polymers useful within the scope of the present invention must have a tensile elongation to break of at least about 25 percent, preferably at least 50 percent and more preferably at least 100 percent. There is no maximum upper limit on the tensile elongation and elastomers which can be stretched several hundred percent beyond their original length can be used in this invention if they can satisfy the other requirements for a suitable polymer. Tensile elongation is measured according to ASTM D-638. A second requirement of the polymer matrix is that it have a tensile strength to break which is greater than 90 percent of the tensile strength to yield. When the tensile strength to break is greater than the tensile strength to yield, this relationship of tensile properties is known as "strain-hardening." Tensile strengths are measured according to ASTM D-638. Referring to FIG. 1, the stress-strain curves designated A and B are typical curves exhibited by structural adhesives. Curve A is exhibited by a nylon-epoxy copolymer (AF-42), Curve B is exhibited by a polyethylene ionomer (Surlyn A 1652). Polymers with such stress-strain curves are indicative of resins useful in the practice of this invention. In Curve A, 11 represents the tensile strength to break, at which point it can be seen the material measured has its greatest tensile strength. There is no well-defined yield point shown by the curve and it can be said that Curve A represents the response of a material having no yield point separate from its breaking point. In Curve B, 12 is a well-defined yield point on a stress-strain curve. In Curve B, there is a direct stress-strain response with the strain $\epsilon$ increasing as the stress $\sigma$ is increased up to 12, after which point, the material continues to yield even though the stress remains constant, or in this case actually falls off, up to 13, after which the material exhibits strain-hardening, i.e. additional strain after the yield point again requires further stressing of the material being tested until the break point 14 occurs at a higher level of stress than the yield point 12. Also shown in FIG. 1 are stress-strain Curves C and D which depict the response of other polymers within the scope of this invention. Curve C is a representation of a polyvinyl butyral polymer (Butvar) which has a break point 15 only slightly lower than the yield point. Curve D describes a nylon 6 polymer having a yield point followed by a gradual increase in the stress required to produce a break, which occurs at 16 at 50 percent elongation. Curves E, F and G depict polymers outside the scope of this invention. Polymer E exhibits a break point 17 far below its yield point. Polymer F exhibits little or no yield prior to its break at 18 and Polymer G exhibits a break point 19 well within 90 percent of its yield point. Both polymers are outside the scope of this invention because they have an elongation less than 25 percent. Curve F is a stress-strain curve representative of polystyrene. Curve G is representative of a standard epoxy resin. Even though break points 18 and 19 of Curves F and G are higher than the break points for Curves B, C and D, the polymers of Curves B, C and D are suitable for use in the practice of this invention whereas the polymers of Curves F and G are not because of their inadequate elongations to break.

A third requirement of polymers useful herein is a minimum lap shear strength. To obtain the maximum degree of reinforcement in composites of this invention, i.e. to break ribbons in tension at all angles in plane parallel to the ribbon surfaces, it is necessary that the lap shear strength of the polymer exhibit a certain relationship to the strength, shape and placement of ribbons within the polymeric composite. This relationship is defined by the following equation: $\tau > \sigma_R t \, X/BY$ where
$\tau$ = lap shear strength of the polymer,
$\sigma_R$ = tensile strength of the ribbon,
t = thickness of the ribbon,
B = minimum overlap distance between ribbons in adjacent ribbon layers,
Y = number of ribbon layers required for a repeat of the ribbon lay-up pattern, and
X = number of ribbon layers that actually carry stress in a thickness equal to the repeat thickness of the ribbon lay-up pattern.

From the above relationship, it can be seen that limitations on the lap shear strength are dependent upon the properties and arrangement of the ribbons and not upon any absolute numerical restrictions. Preferred numerical limitations on lap shear strength are at least about 500 psi, more preferably at least about 2,000 psi. More meaningful than absolute numerical limitations are figures which express the extent to which the lap shear strength of the polymer exceeds the value of $\sigma_R t \, X/B Y$. Preferably the experimentally measured lap shear strength of polymers useful herein should exceed the theoretical minimum by at least 10 percent, more preferably at least 25 percent.

The experiment to determine the lap shear strength of the resin is adapted from the ASTM Standard Method of Test D 1002-64 "Strength Properties of Adhesives in Shear by Tension Loading." The ASTM test requires a test specimen one-sixteenth inch thick. In order to test thinner composites directly without forming them into the necessary thickness, the following method has been employed.

The resin is applied to two strips of ribbon joined by the resin in a manner identical to that used for composite preparation. This includes the cleaning of the ribbon, the method of applying the resin to the ribbons, the thickness of resin, and the fabrication method (temperature, pressure and time). The test is conducted on an Instron testing machine with self aligning grips.

The force, F, applied to the system either breaks the ribbon in tension or the resin in shear:

$$F_R = \sigma_R \times Wt$$
$$F_S = \tau \, W \, B$$

where $\sigma_R$ is the ribbon tensile strength, B is the overlap distance, W is the width of the ribbon, and $\tau$ is the lap shear strength. The Critical Value of length (overlap), $B_c$, is determined at the condition of equal probability of ribbon and shear failure, i.e., $$F_R = F_S \, \sigma_R \, Wt = \tau \, WB_c$$

Thus:

$$B_c = (\tau_R/\sigma) \, t$$

If $B > B_c$, the ribbon breaks in tension and the ribbon tensile strength is determined:

$$\sigma_R = F/Wt$$

If $B \quad B_c$, the lap joint fails in shear and the lap shear strength is determined:

$$\tau = F/WB$$

It should be noted that the lap shear strength of any polymer is measured in conjunction with a ribbon of a specific material and can vary somewhat from one type of material to another. Hence figures for lap shear strengths of polymers which are specified and reported herein should be considered in conjunction with the ribbon material. If no ribbon material is specified, the lap shear strength figures should be considered to specify a polymer which will have the indicated strength with some type of ribbon.

Typical polymers useful in the composites of this invention include polyethylene ionomers, polyvinyl acetals, polyvinyl formals and polyvinyl butyrals, polyurethanes, nylons such as nylon 6 and nylon 6, 6, nylon-epoxy copolymers and other modified nylons having the three requisite property limitations set forth herein, phenol-formaldehyde and urea-formaldehyde copolymers, polyvinyl alcohols, vinyl acetate copolymers and others.

Since one of the principal objectives of the invention is the provision of composites having high strengths, and since the high strengths can only be attained if the ribbons have high tensile strengths, preferred ribbons have a tensile strength along the axis spanning their widths of at least about 5,000 psi, preferably at least about 25,000 psi, and more preferably at least about 100,000 psi. Tensile strengths measured along the longitudinal axis of the ribbons will usually be larger. There is no preferred upper limit on the tensile strengths of the ribbons since ribbon strength is related not only to the lap shear strength of the polymer but also to the ribbon shape and orientation in the matrix. Ribbons having very high tensile strengths, even as high as one million psi or more, can be advantageously used to produce composites having a high strength to weight ratio.

An important limitation on the ribbons useful in the composites of this invention is the strength to weight value of the ribbon. The value is ascertained according to the following formula:

$$\sigma/(10)\ P \times E/P = SWV\ \text{(strength to weight value)}$$

where $\sigma$ is the tensile strength of the ribbon in psi $\times 10^3$
$P$ is the density of the ribbon in lbs. per in.$^3$
$E$ is the tensile modulus of the ribbon in psi $\times 10^6$ If the strength to weight value is too low, superior biaxial reinforcement cannot be attained using the polymers of this invention. If the ribbon has a high strength but a correspondingly high density, the composite to acquire good mechanical properties in a direction transverse to the ribbon length must contain such a large amount of ribbon that the composite becomes excessively heavy and thereby loses the light weight advantages of polymeric composites. Hence it is important that the ribbons used herein have strength to weight values of at least 250, preferably at least 350, and more preferably at least 500. Examples of ribbons having suitable strength to weight values include E and S glass with strength to weight values ranging from about 330 to about 450, and graphite ribbons with strength to weight values ranging from about 700 to 1,000 or more. Most steels have strength to weight values which are too low to be useful herein, being in the range of 150 to 200. Similarly, aluminum is also outside the purview of this invention with strength to weight values in the same range as that of steel, 150 to 200. Many polymeric ribbons, although having a desirably low density, also have strength properties which are sufficiently low to give them strength to weight values of 100 to 200, thereby making them unsuitable for use herein.

One direct relationship of the ribbon to the polymer matrix can be expressed in terms of the ratio of the tensile moduli of the two materials. The ratio of the ribbon's tensile modulus to that of the polymer is referred to herein as the ribbon's tensile modular ratio. The ribbon must have a tensile modulus at least about 5, preferably at least about 10, and more preferably at least about 25, times greater than the tensile modulus of the polymer matrix. In many instances, the ribbon modulus will be 50 to several thousand times greater than the polymer modulus. Many of the polymers which are useful in this invention have tensile moduli from about 5,000 to 500,000 psi. Hence ribbons which are successfully used with polymers having the foregoing properties can have tensile moduli from about 25,000 to several hundred million psi or more.

The amount of ribbon present in the composites can vary widely. As a generalization, it is desirable to have at least about 15 or 20 volume percent ribbon in the composite if appreciable reinforcement is to be obtained. The maximum limitation on ribbon content of the composites is established by ascertaining the minimum amount of polymer necessary to hold the ribbons in the desired alignment and orientation. For most of the polymers which are useful in this invention at least about 10 volume percent has been required. Hence the maximum ribbon concentration in the composites is about 90 volume percent. A preferred range of ribbon content is from about 25 to about 80, and more preferably from about 50 to about 80, volume percent of the total composite.

Figure 2:
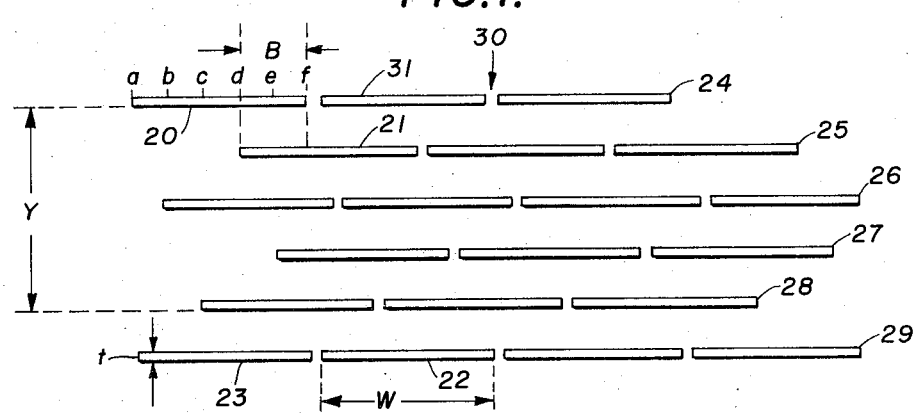
FIG. 2 is a vertical sectional view of a composite showing ribbons oriented within a matrix.
Figure 3:
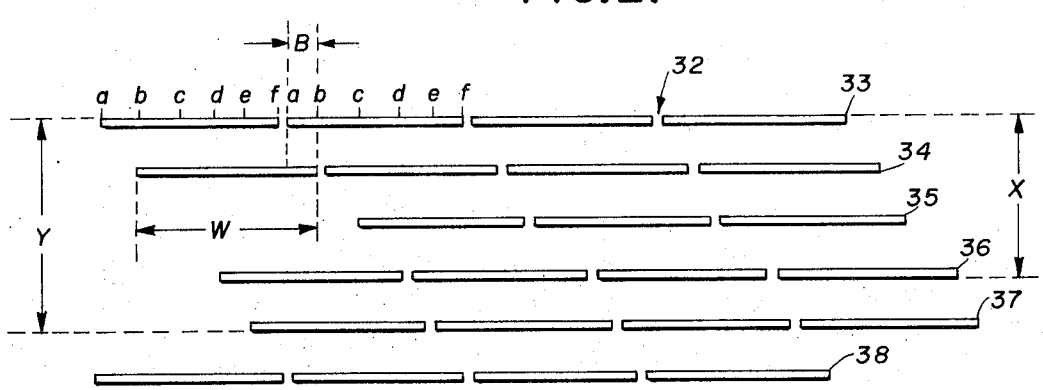
FIG. 3 is a vertical sectional view of another composite showing ribbons oriented within a matrix in a different arrangement from that shown in FIG. 2.

The orientation of the ribbons in the matrix is another interdependent variable having a broad range of suitable values. Reference to FIGS. 2 and 3 will facilitate a full understanding of the parameters of ribbon orientation. In FIG. 2, one possible ribbon arrangement is shown. A ribbon 20 has a thickness $t$ and a width W with six equidistant points a, b, c, d, e and f indicated along the width W of the ribbon. For clarity of presentation, the distances W and $t$ are shown on ribbons 22 and 23 instead of ribbon 20 since that ribbon is used to illustrate the distance B. Te overlap distance B is a measure of the minimum extent to which ribbons such as ribbons 20 and 21 in two adjacent ribbon layers such as layers 24 and 25 overlap each other. It should be noted that B is referred to as the minimum overlap distance since a ribbon such as ribbon 21, which overlaps ribbon 20 by two units of length, also overlaps ribbon 31 by three units of length. The minimum overlap distance B for the ribbon arrangement shown in FIG. 2 is two units. In FIG. 3, the minimum overlap distace B is one unit. Layers 24 to 28 in FIG. 2 and layers 33 to 37 in FIG. 3 comprise a complete unit Y in the lay-up pattern insofar as ribbon layers 29 and 38 represent the first layer in another unit. X is the minimum number of ribbons in a lay-up pattern Y which are capable of carrying stress. Viewed vertically downwardly from ribbon gap 30 in FIG. 2, it can be seen that of the five ribbon layers 24 to 28 in the repeating lay-up pattern, a minimum of four of them, layers 25 to 28, are capable of carrying stress. Since failure of the composites of this invention occurs at one of the ribbon gaps, usually at a ribbon gap on the exterior surface of the composite, it can be seen that, regardless of where the composite breaks, there will be at least four ribbons which carry the stress load applied prior to failure of the composite. Hence for FIG. 2, X has the value 4. The same is true for the pattern shown in FIG. 3, i.e., X has the value 4.

Preferred for use in this invention are lay-up ribbon patterns where Y is an odd number, preferably at least 5 and more preferably 5, 7 or 9. In conjunction with the foregoing lay-up patterns, it is additionally preferred that X be a value one digit lower than Y. In making the composites of this invention, it is important to employ some means for arranging and holding a layer of ribbons in a fixed position during the fabrication steps. A number of techniques can be employed. Ribbons can be arranged in parallel fashion and secured in that position with an adhesive tape or sheet. The ribbon layer can then be moved or otherwise handled without disturbing the spatial relationship of the ribbons. The adhesive characteristics of the tape or sheet can be of such a nature that the tape or sheet can be removed from the ribbon layer by placing the ribbons in contact with a substance having a stronger adhesive strength than that of the tape or sheet, and then peeling the tape or sheet off the layer of ribbons which remain secured to the more adhesive substance which could be the polymeric medium. Another technique comprises weaving a fabric around ribbons to hold them in a predetermined orientation. After the ribbon-containing fabric is placed on a polymer layer, the fabric can be dissolved by treatment with an appropriate solvent leaving the ribbons positioned on the polymer. Alternatively, the ribbons can be laid down on a polymer directly by hand or more preferably by means of any of a number of commercially available machines designed for the purpose. Following the positioning of the ribbons on a polymer layer, a second polymer layer can be placed on top of the ribbons, thereby sandwiching the ribbons between the polymeric medium. A second layer of ribbons can then be laid down in some appropriate manner taking care to provide the overlap necessary for the desired lay-up ribbon pattern.

In forming a ribbon layer for the composite being prepared, the ribbons are preferably spaced closely together so that the distance between individual ribbons is small by comparison to the widths of the ribbons. For ribbons 0.5 inch in width, a spacing distance of 0.015 inch has been used. One inch wide ribbons have been spaced 0.05 inch apart although a spacing of 0.020 inch is preferred. Other suitable spacings can of course be used with the recognition that wide spacings may result in a ribbon pattern where the X value in the lap shear strength formula set forth above may be lower than would otherwise be with close inter-ribbon spacing.

EXAMPLE 1

Ribbons of E glass having a width of 0.5 inch, a thickness of 0.002 inch and a strength to weight value of 400 are laid down parallel to one another onto strips of adhesive tape which are placed perpendicular to the longitudinal axis of the ribbons. The strips of adhesive tape are spaced 12 inches apart. The ribbons are spaced 0.015 inch apart on the adhesive tapes. The ribbons are then placed on a film of polyethylene ionomer (Surlyn A 1652) 0.002 inch thick and a second ionomer film is placed over the ribbons, sandwiching them between the polymer films. The polymer films are of such a size that they can be placed over the ribbons between the adhesive tapes. A second ribbon layer is then placed on the upper polymer layer parallel to the first ribbon layer so that the widths of the ribbons of the second layer overlap two-fifths of the widths of the ribbons in the first layer, i.e., 0.2 inch. The alternating lay-up of polymer film and ribbons is repeated until 15 layers of ribbon have been laid down. The ends of the ribbons containing the adhesive tape, extending beyond the polymer films, are trimmed flush with the films and the trimmed laminate is hot pressed between two stainless steel plates at 130°C and 80 psi for 15 minutes. The finished composition contains 51 percent by volume glass ribbon.

Density of the composite in pounds per cubic inch is 0.063. Tensile strength of the ribbon, $\sigma_R$, is 300,000 psi. The minimum overlap distance, B, is two-fifths of the ribbon width or 0.2 inch. Thickness of the ribbon, $t$, is 0.002 inch. The number of ribbon layers required to complete a lay-up pattern, Y, is 5; the minimum number of layers in a lay-up pattern which actually carry stress, X, is 4. The minimum suitable lap shear strength for a polymer useful with the above ribbons and their lay-up pattern is determined by the formula $$\tau = \rho_r \, X/Y \, t/B = = 3 \times 10^5 \times 4/5 \times 1/100 = = 2.4 \times 10^3 \text{psi}.$$

The experimentally determined lap shear strength of the polyethylene ionomer is $2.0 \times 10^3$ psi. Hence failure of the polymer in the composite is predicted, an undesirable result. Tensile strength of the composite in the direction perpendicular to the ribbons' longitudinal axes and parallel to the ribbons' flat surfaces is 46,000 psi. Tensile modulus is $4.0 \times 10^6$ psi.

EXAMPLE 2

Example 1 is repeated exactly except for the following changes. The polyethylene ionomer film is replaced with a nylon-epoxy copolymer (AF–42). After the lay-up of ribbons and film has been completed, the laminate is hot pressed at 175°C for 1 hour. The finished composition contains 55 percent by volume glass ribbon. Since the ribbon shape and orientation are the same as in Example 1, the minimum suitable lap shear strength for the polymer is the same, i.e., $2.4 \times 10^3$ psi. The experimentally determined lap shear strength for the epoxy-nylon copolymer is $3 \times 10^3$ psi. Hence failure of the ribbons, a desirable result since they are the strongest component of the composite, is predicted. Tensile strength of the composite measured in the direction perpendicular to the longitudinal axis and parallel to the flat surface of the ribbons is 93,000 psi. Tensile modulus is $4.1 \times 10^6$ psi.

EXAMPLE 3

The procedure of Example 1 is followed exactly except that the layers of glass ribbon are laid down so that the width of a ribbon in a layer overlaps one half of the width of a ribbon in an adjacent layer. The minimum suitable lap shear strength for the polymer is $1.2 \times 10^3$ psi. Since the actual experimental lap shear strength of the polymer is $2.0 \times 10^3$ psi, the desired result of ribbon failure should be attained. Tensile strength of the composite perpendicular to the longitudinal axis and parallel to the flat surface of the ribbons is 69,000 psi. Tensile modulus is $4.4 \times 10^6$ psi.

EXAMPLE 4

The procedure of Example 2 is followed exactly except that the layers of glass ribbon are laid down so that the width of a ribbon in a layer overlaps one fifth of the width of a ribbon in an adjacent layer. The calculated minimum lap shear strength for a suitable polymer is $4.8 \times 10^3$ psi. Since the actual lap shear strength for the nylon-epoxy copolymer is $3 \times 10^3$ psi, failure of the polymeric composition in the composite is predicted.

Tensile strength of the composite measured in the same direction as in the previous Examples is 30,000 psi. Tensile modulus is 3.6 × 10⁶ psi.

EXAMPLE 5

Graphite ribbons having a tensile strength of $2.0 \times 10^5$ psi, a width of 0.5 centimeter (0.197 inch), a thickness of 25 microns (0.001 inch) and a strength to weight value of 800 are formed into layers in the manner described in Example 1 using the polymer film of Example 1. Adjacent ribbon layers are overlapped one third their widths. The finished composite contains 48 volume percent ribbon. The graphite ribbon has a strength to weight value of 850. The minimum lap shear strength for a suitable polymer is $2.0 \times 10^3$ psi. Since the actual lap shear strength for the nylon 6 being used is $2.3 \times 10^3$ psi, failure of the ribbon in the composite is predicted. Tensile strength of the composite measured in the same direction as in the previous Examples is $61 \times 10^3$ psi. Tensile modulus is $11.5 \times 10^6$ psi.

EXAMPLE 6

Example 5 is repeated except that a polyethylene ionomer having a lap shear strength of $1.7 \times 10^3$ psi is used. Tensile strength is $23 \times 10^3$ psi. Tensile modulus is $7.3 \times 10^6$ psi. The properties of this composite, which is outside the scope of the present invention, are substantially less than the properties of the composite of Example 5 because the lap shear strength of the polymer used falls below the calculated minimum lap shear strength.

EXAMPLE 7

The procedure of Example 1 is followed exactly except that a thermosettable modified nylon (Cycleweld 501C) is used instead of the polyethylene ionomer. The lap shear strength of the nylon is $2.8 \times 10^3$ psi. Since the minimum lap shear strength which is required for a resin to provide good mechanical properties in the finished composite is $2.4 \times 10^3$ psi, failure of the ribbons when subjected to a breaking stress in the direction perpendicular to the longitudinal axis of the ribbon is predicted. Tensile strength of the composite measured in the same direction as in the previous Examples is $90,000 \times 10^3$ psi. Tensile modulus is $3.5 \times 10^6$ psi.

EXAMPLE 8

The procedure of Example 1 is followed exactly except that an unplasticized polyvinyl butyral (Butvar) is used instead of the PE ionomer. Minimum calculated lap shear strength is $2.4 \times 10^3$ psi; actual experimental lap shear strength is $3.0 \times 10^3$ psi. Tensile strength measured in the same direction as in the previous Examples is $125 \times 10^3$ psi. Tensile modulus is $5.8 \times 10^6$ psi.

A comparison of Examples 1 and 2 shows the importance of selecting a polymer with a lap shear strength exceeding the minimum suitable strength calculated for a given ribbon and lay-up pattern. In Example 1, the lap shear strength of the polymer falls just barely short of the calculated minimum. The results show that failure occurs in the composite at a much lower stress than in the composite of Example 2, where the lap shear strength of the polymer exceeds the calculated minimum strength. Example 3 shows that the difference in performance is not due solely to the choice of polymer since the unsuccessful resin of Example 1 is used quite successfully with the same type of ribbon arranged in a different pattern. Example 4 similarly shows the unsuccessful performance of the resin successfully used in Example 2 when a different lay-up pattern is employed. In this comparison, it should also be noted that the number of ribbons in the five-layer pattern which carry stress is the same for both composites, i.e., 4. Put another way, the X/Y value is the same for both composites, 4/5. In addition, the ribbon type, ribbon thickness, volume content of ribbon and resin, resin type and resin film thickness are also identical for the composites of Examples 2 and 4. Example 2 nevertheless produces a composite which is more than three times stronger than the composite of Example 4. Examples 5 and 6 using graphite ribbon show the criticality of the polymer's meeting or failing to meet the minimum lap shear strength calculated according to the formula presented. Examples 7 and 8 show other suitable polymers which can be used successfully in this invention.

The composites of this invention can be used in applications where high strength per unit weight is an important consideration. The composites will find particular application in uses where bidirectional or multidirectional strength is desired or required. The size and shape of the composites will influence many of their end uses. For instance articles an inch or more in thickness can serve as loadbearing members in structural applications. Or the articles can be fabricated in large moldable sheets, shaped to the contour of some desired article and cured to form a rigid strong product which can be used alone or laminated with other functional or decorative coatings. A third application could be as thin sheets which could be sandwiched between other materials such as elastomers to provide a strong, flexible, impact-resistant composite which can be used in the manufacture of tire bodies. A wide variety of other uses will become apparent to those skilled in the art in view of this disclosure.

What is claimed is:

1. A ribbon-reinforced composite comprising a polymer and ribbon reinforcement oriented in said polymer in layers, such that the ribbons in the polymer are substantially parallel to one another, a. said polymer having a tensile elongation to break greater than about 25 percent, a tensile strength to break which is at least 90 percent of the tensile strength to yield; and a lap shear strength greater than $\sigma_R\, t\, X/B\, Y$
   where $\sigma_R$ is the tensile strength of the ribbon,
   $t$ is the thickness of the ribbon,
   B is the minimum overlap distance between ribbons in adjacent ribbon layers,
   Y is the number of ribbon layers required for a repeat of the ribbon lay-up pattern, and
   X is the minimum number of ribbon layers that actually carry stress in a thickness equal to the repeat thickness; and
   b. said ribbon reinforcement having a tensile modular ratio greater than about 5, a strength to weight value of at least about 250, and being present in an amount from about 20 to about 90 percent by volume of the total composite and positioned in the composite in such a manner that X/Y is between 0.5 and 1, B is not greater than one-half W, and the number of layers is at least 2 Y when Y is 3 or less, where X, Y and B are as defined above and W is the width of the ribbon.

2. A composite according to claim 1 wherein the tensile elongation to break of said polymer is at least about 50 percent.

3. A composite according to claim 1 wherein the lap shear strength of the polymer exceeds the value $\sigma_R t$ X/B Y by at least 10 percent.

4. A composite according to claim 1 wherein the lap shear strength for the polymer exceeds the value $\sigma_R t$ X/B Y by at least 25 percent.

5. A composite according to claim 1 wherein said polymer is a polyethylene ionomer resin.

6. A composite according to claim 5 wherein said polyethylene ionomer resin has a lap shear strength of at least about $2 \times 10^3$ psi.

7. A composite according to claim 1 wherein said polymer is polyvinyl butyral.

8. A composite according to claim 7 wherein said polyvinylbutyral has a lap shear strength of at least about $2.5 \times 10^3$ psi.

9. A composite according to claim 1 wherein said polymer is a thermosetting epoxy-nylon copolymer.

10. A composite according to claim 9 wherein said copolymer has a lap shear strength of at least about $4.0 \times 10^3$ psi.

11. A composite according to claim 1 wherein said polymer is a thermoset nylon.

12. A composite according to claim 1 wherein said polymer is a thermoplastic nylon.

13. A composite according to claim 11 wherein said nylon has a lap shear strength of at least about $3.4 \times 10^3$ psi.

14. A composite according to claim 1 wherein the ribbon has a tensile modular ratio of at least about 25.

15. A composite according to claim 1 wherein the ribbon has a strength to weight value of at least about 350.

16. A composite according to claim 1 wherein the ribbon is present in an amount from about 25 to about 80 percent by volume of the composite.

17. A composite according to claim 1 wherein the ribbon has a transverse tensile strength of at least about $200 \times 10^3$ psi.

18. A composite according to claim 1 wherein the ribbon is E glass.

19. A composite according to claim 1 wherein the ribbon is graphite.

* * * * *